United States Patent [19]
McMahon
[11] 3,771,129
[45] Nov. 6, 1973

[54] OPTICAL PROCESSOR FINGERPRINT IDENTIFICATION APPARATUS

[75] Inventor: Donald H. McMahon, Carlisle, Mass.
[73] Assignee: Sperry Rand Corporation, New York, N.Y.

[22] Filed: July 27, 1972
[21] Appl. No.: 275,619

[52] U.S. Cl. ....... 340/146.3 E, 340/146.3 F, 356/71, 250/219 CR
[51] Int. Cl. .............................................. G06k 9/13
[58] Field of Search ............... 340/146.3 E, 146.3 F, 340/149 R; 250/219 CR; 356/71

[56] References Cited

UNITED STATES PATENTS

| | | | |
|---|---|---|---|
| 3,511,571 | 5/1970 | Ogle | 340/146.3 E |
| 3,036,153 | 5/1962 | Day | 340/146.3 F |
| 3,522,437 | 8/1970 | Bargh | 340/146.3 F |
| 3,205,367 | 9/1965 | Whitesell | 250/219 CR |

*Primary Examiner*—Daryl W. Cook
*Assistant Examiner*—Joseph M. Thesz, Jr.
*Attorney*—Howard P. Terry

[57] ABSTRACT

An incoherent optical processor fingerprint identification apparatus employing a rotatable grating for inspecting the line orientation in a plurality of preselected finite sample areas of a fingerprint. A detector array including a plurality of detectors each relating to a discrete sample area is disposed to receive an image of the fingerprint filtered through the grating. An incoherent light source and a lens and retroreflective prism assembly function in cooperation with the grating to produce an image thereof superposed on the grating such that minimum light is propagated to the detector array in the absence of an input fingerprint at the prism whereas in the presence of a fingerprint light is diffracted thereby to filter through the grating to the detectors. Maximum light occurs at each detector under a condition of spatial alignment of the grating lines with the ridge lines of the related sample area whereby the time interval between a reference orientation of the grating and the instant of maximum light at each detector may be converted to equivalent electrical signals uniquely representative of a particular fingerprint.

11 Claims, 4 Drawing Figures

OPTICAL PROCESSOR FINGERPRINT IDENTIFICATION APPARATUS

BACKGROUND OF THE INVENTION

1. Field of the Invention

This invention relates generally to optical signal processors and more particularly to an incoherent optical signal processing fingerprint identification apparatus.

2. Description of the Prior Art

In the past few years there has been considerable activity in the optical signal processing art directed toward the development of fingerprint identification techniques with the objective of achieving automated high speed identification capable of being performed without the services of a skilled operator for various applications such as plant security, law enforcement and credit card identification. Previously developed identification devices include, for example, simple coherent and incoherent comparator type processors in which an image of a fingerprint to be identified is compared optically with a prerecorded image of the fingerprint. The coherent type optical processors have also been constructed utilizing Fourier techniques wherein comparison is made between input and prerecorded Fourier transforms representative of the fingerprint data. Both conventional and holographic techniques have been used in the implementations of these image and Fourier transform comparators which are essentially matched filters or autocorrelation devices providing an indication simply of either comparison or non-comparison between the prerecording of the fingerprint and a spatially modulated optical beam representative of the print. In other somewhat more sophisticated devices provision is made for inspecting or comparing certain details of the input fingerprint with prerecorded fingerprint data; for instance, the location of ridge line endings or the slope of the ridge lines in one region relative to the slope of the lines in another region.

The present invention is most closely related to the apparatus disclosed in U.S. patent application Ser. No. 219,716 filed Jan. 21, 1972 in the name of D. H. McMahon and assigned to the instant assignee. That application discloses a coherent type optical processor wherein the fingerprint ridge line orientations are inspected in a plurality of preselected finite sample areas of the fingerprint by means of a rotating spatial slit filter disposed in the Fourier transform plane of an optical processor for sequentially transmitting distinct components of the Fourier transform to the image plane of the processor where a plurality of photodetectors are located each corresponding to a discrete sample area. The time delay between a reference orientation of the slit filter and the occurrence of peak light at each detector is noted and a proportional analog or digital representation thereof generated for storage and subsequent comparison with similarly obtained signals representative of fingerprints presented for identification. It is readily apparent that a system which scrutinizes the ridge line details in a plurality of areas will provide enhanced discrimination capability compared to the previously discussed single data bit matched filter devices and in addition afford the advantage of permitting digitalizing of the data if desired for compatibility with digital computer processing which clearly is not possible with a single data bit. Fourier techniques, however, relate to coherent processing and therefore require the use of a coherent light source such as a laser. A suitable incoherent processing technique would therefore be advantageous from the viewpoint of enabling use of a conventional light source. An incoherent light source cannot be used in conjunction with Fourier processing though because the undiffracted light of an incoherent source tends to smear into diffracted light in the Fourier or spatial frequency plane thereby seriously degrading operational performance. This problem could be avoided if it was possible to convert the incoherent source to an equivalent point source, but this can be done only at the expense of discarding most of the available light intensity with the result that the remaining available light intensity become so low as to be unsuitable for any practical application.

Accordingly, it is a principal object of the present invention to provide a novel fingerprint identification apparatus which is suitable for use with incoherent as well as coherent light sources but nevertheless retains the advantageous features of the apparatus disclosed in the prior McMahon application regarding enhanced discrimination and digital computer processing compatibility. It should be understood though, and in fact it will be apparent to those skilled in the art, that although the invention is described herein with reference to fingerprint analysis or identification it is also applicable to general pattern or character recognition on the basis of measuring the orientation of light transmissive or reflective lines.

SUMMARY OF THE INVENTION

As is generally well understood, a fingerprint is characterized by a pattern of ridge lines having relatively constant spacing and orientation over any finite small area. The invention is based on inspection of the ridge line orientations in a plurality of small sample areas distributed over the area of the fingerprint. It will be appreciated that in a given fingerprint, the various ridge line orientations at the plurality of sample positions will be uniquely different from the ridge line orientations at a plurality of similar positions of any other fingerprint provided a sufficient number of sample areas is used. More specifically, the invention is based on the idea disclosed in the prior McMahon application of utilizing a detector array consisting of a plurality of detectors for sampling light diffracted from the ridge lines of a corresponding plurality of discrete finite areas of the fingerprint. The detector array is used in combination with a rotating line grating which is imaged on itself such that no information bearing light reaches any of the detectors in the absence of a fingerprint at the input of the identification apparatus. When a finger or transparency of a fingerprint pattern is present at the input, however, light is diffracted by the ridge lines so that under a condition where the grating lines are parallel to the ridge lines of any sample area a maximum or high intensity light signal reaches the associated detector, whereas for a prependicular orientation of the grating lines relative to the ridge lines, the associated detector receives a minimum light signal.

The illustrative embodiments disclosed hereinafter in the detailed description are categorized broadly as on-axis and off-axis systems. The designation on-axis simply implies that the rotational axis of the grating is coincident with the optical axis of the light beam used in the apparatus, and likewise the designation off-axis simply indicates that the optical axis of the light beam is displaced laterally from the rotational axis of the grating.

As will become apparent from a reading of the detailed description, certain advantages accrue from off-axis systems and for this reason they are presently regarded as constituting the preferred embodiments. In any case, it should be understood that for ridge lines of any particular orientation, the conditions of minimum and maximum light intensity occur as described above irrespective of the location of the related ridge lines in the total area of the fingerprint under inspection. It should also be understood, that since a particular detector is uniquely associated with each sample area of a fingerprint, the time of occurrence of the minimum or maximum signal at the respective detectors during the course of a revolution of the grating will be uniquely related to an individual fingerprint. Thus, a fingerprint can be encoded by noting the time lapse subsequent to an arbitrary time reference or spatial orientation of the grating at which an extremum value of light intensity occurs at the respective detectors and converting these time intervals to equivalent analog or digital signals representative of the fingerprint.

It will be recognized that although certain sample areas of different fingerprints may have essentially similar ridge line orientations, it is highly unlikely that the ridge line orientations in all of the individual sample areas of one fingerprint will be the same or nearly the same as those in the corresponding sample areas of another fingerprint except in the case of almost identical fingerprints. Under such circumstances, discrimination of the fingerprints may not be possible with the processor and the ultimate correlation or discrimination will have to be performed by means of the conventional human operator visual comparison method.

Apparatus embodying the inventive concept is used in the following manner. Initially, a known fingerprint is digitally encoded by placing it at the input of the processor. Encoding is accomplished by generating a sequence of synchronized timing pulses representative of the grating orientation relative to a reference orientation and applying the pulses to a digital counter which in turn is coupled to a plurality of multistage storage registers for parallel digital signal processing. When the signal amplitude of each photodetector abrutly changes as previously explained, a gate pulse is applied to the stages of the associated storage register causing the instantaneous counter reading to be transferred to that register. As a result of this action, each storage register contains a unique set of binary signals representative of the ridge line orientation of a discrete sample area of the known fingerprint. The same procedure is followed for each fingerprint desired to be encoded and stored. The encoded signals representative of various fingerprints are stored in any convenient manner suitable for rapid access and subsequent correlation with encoded signals obtained in the course of inspecting fingerprints at some later time for the purpose of identification. Identification is made when a fingerprint presented for inspection produces encoded signals identical or at least substantially identical to one of the sets of stored encoded signals, for which condition autocorrelation of the input and stored signals results.

DESCRIPTION OF THE PREFERRED EMBODIMENTS

Figure 1:
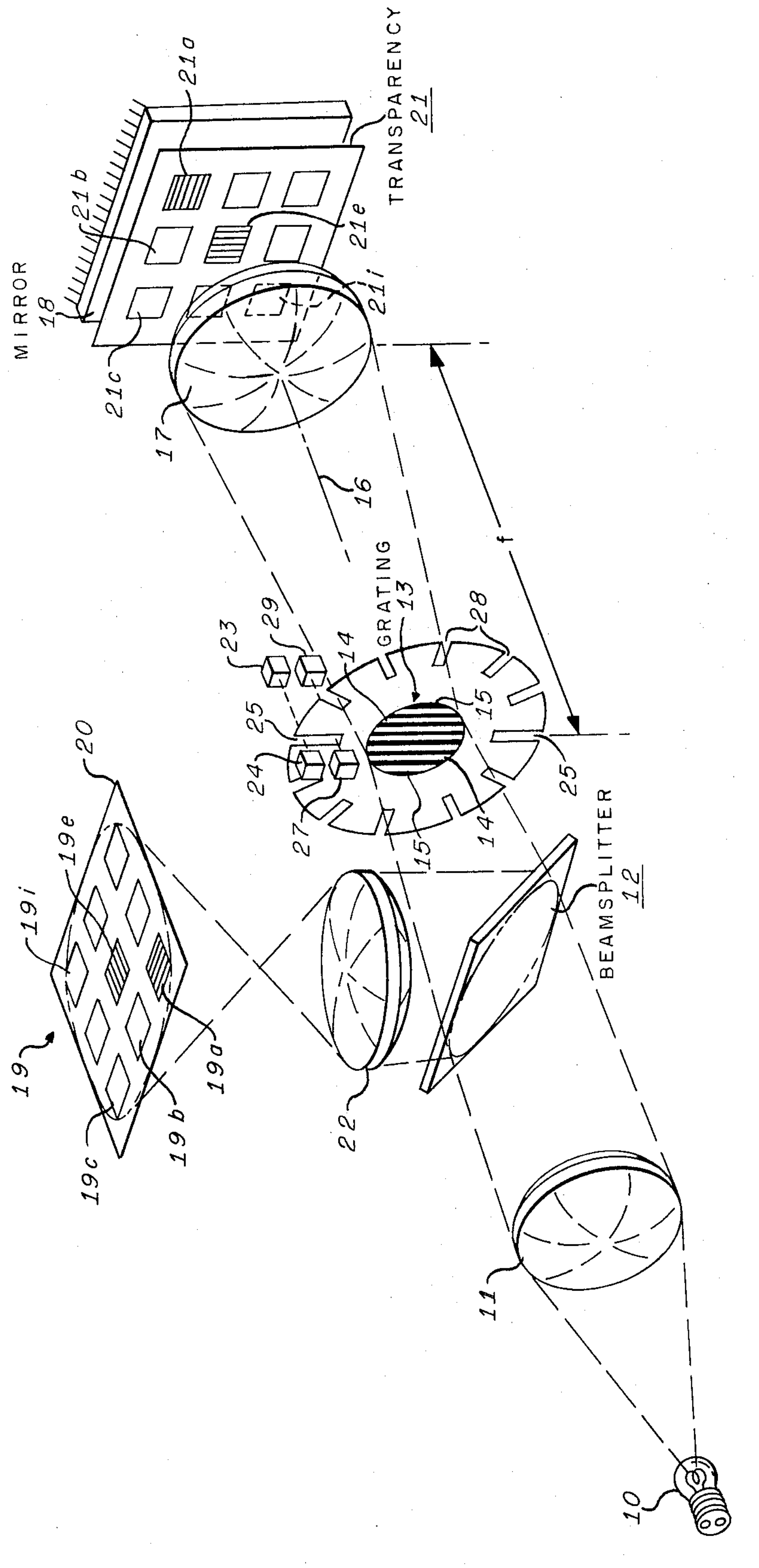
FIG. 1 is a perspective illustration of an on-axis fingerprint identification apparatus constructed in accordance with the principles of the present invention.

FIG. 1 depicts an on-axis configuration of the invention wherein light emitted from tungsten light source 10 is collected by lens 11 and converged onto beamsplitter 12 through which part of the light propagates to irradiate grating 13. The grating has alternate transparent and opaque lines 14 and 15 and is rotatable, as by a peripheral gear drive (not shown), about its center along an axis 16 coincident with the optical axis of lens 11. In this embodiment the opaque lines may be reflective as in the later described preferred embodiments. The significant requirement of the opaque lines in the on-axis embodiment is that preferably they should be characterized by high light absorption and the word 'reflective' used with reference to the grating lines in the appended claims is intended to cover these alternatives. In any case, for suitable operation, the beam should illuminate at least several lines of the grating. Lens 17 positioned on the side of the grating opposite the beamsplitter, at a distance from the grating equal to the focal length *f* of the lens, acts in cooperation with morror 18 to produce an unmagnified image of the irradiated portion of the grating superposed on the grating such that the illuminated lines of the image coincide with the opaque lines of the grating while the dark image lines likewise coincide with the transparent grating lines. This is achieved by arranging the various components of the system so that the rotational axis of the grating is aligned with the optical axis of the system and located at the edge of adjoining transparent and opaque lines. Uniformity of the grating line width, of course, is also required. Under these conditions, the superposed grating image light does not propagate back through the grating onto the beamsplitter 12 and therefore none of the light of the incoherent source reaches detector array 19 which consists of a plurality of detectors 19*a* to 19*i* arranged in a two-dimensional matrix in plane 20. As the grating rotates, the grating image rotates at the same angular rate so the incoherent light is continuously blocked from the photodetectors. The foregoing description applies to the situation wherein a fingerprint is not present at the input of the device in the path of the incoherent light transmitted through the grating from the beamsplitter.

Now consider the operation of the apparatus in the presence of an input fingerprint transparency 21 placed adjacent mirror 18. First though, it should be understood that the means by which the transparency is supported is inconsequential and may be accomplished in any suitable and convenient manner, for instance, by a fixture attached directly to the mirror or by independent support means positioned proximate the mirror. The important point regarding the transparency support is that it must function to permit placement of the transparency sufficiently close to the mirror and preferably in contacting relation therewith so the light passed by transparent regions of the transparency during the first passage is not blocked by opaque regions of the transparency during the second passage in the reverse direction. The light diffracted from the fingerprint constitutes the information bearing component of light which is reflected back to the grating along with the undiffracted superposed grating image light. Unlike the superposed image light, the diffracted light is not confined to the regions occupied by the opaque lines of the grating but instead spreads into the regions of the transparent lines and is thus passed through the grating and reaches the detector array. The direction in which the reflected diffracted light spreads, horizontally or vertically or otherwise, is of course dependent on the orientation of the ridge lines in each finite area of the transparency. Moreover, as will be described momentarily, the intensity of the light transmitted to the individual detectors varies cyclically through minimum and maximum values during each half revolution of the grating in accordance with the instantaneous angular orientation of the grating lines relative to the ridge lines of the respective sample areas.

Examination of the ridge lines at a plurality of discrete finite areas distributed over the total area of the fingerprint is accomplished by means of lens 22 which collects the diffracted light filtered through the grating and reflected from beamsplitter 12 to form a filtered image of the transparency at detector plane 20. Thus, photodetector 19*a* has formed thereon an image of sample area 21*a* of the transparency. Likewise, photodetector 19*e* receives a filtered image of sample area 21*e* of the transparency and so on for a one to one correspondence of the remaining detectors and sample areas of like letter notation.

For the purpose of further explanation, assume that the ridge lines of sample areas 21*a* and 21*e* are horizontally and vertically oriented, respectively, as illustrated in the drawing. Further assume for the moment that the diffracted light spreads an amount equal to the width of one transparent or opaque line. Under these conditions, when the grating is oriented so that the lines thereof are vertically oriented and thus in spatial alignment with the ridge lines of sample area 21*e*, the light intensity transmitted to photodetector 19*e* will be at a maximum value since the related ridge lines diffract the light horizontally into the regions of the transparent grating lines. At the same instant, the light intensity reaching photodetector 21*a* from the ridge lines of sample area 19*a* is at a minimum value inasmuch as these ridge lines spread the light vertically and thus light so diffracted is confined to the region of the opaque grating lines along with the undiffracted light producing the aforementioned superposed grating image. After the grating has rotated one quarter revolution whereupon the grating lines become spatially aligned with the ridge lines of sample area 19*a* and perpendicular to the ridge lines of sample area 19*e*, the light intensity reaches maximum and minimum values respectively at photodetectors 19*a* and 19*e*. Another quarter of a revolution later the light at photodetector 19*a* returns to a minimum while that at photodetector 19*e* again increases to a maximum and so on in each subsequent half revolution of the grating. Ridge lines skewed at angles intermediate the illustrated horizontal and vertical directions will provide respective maximum and minimum signals in a similar manner at such times as the grating lines are respectively parallel and perpendicular to the ridge lines of the individual sample areas.

Figure 4:
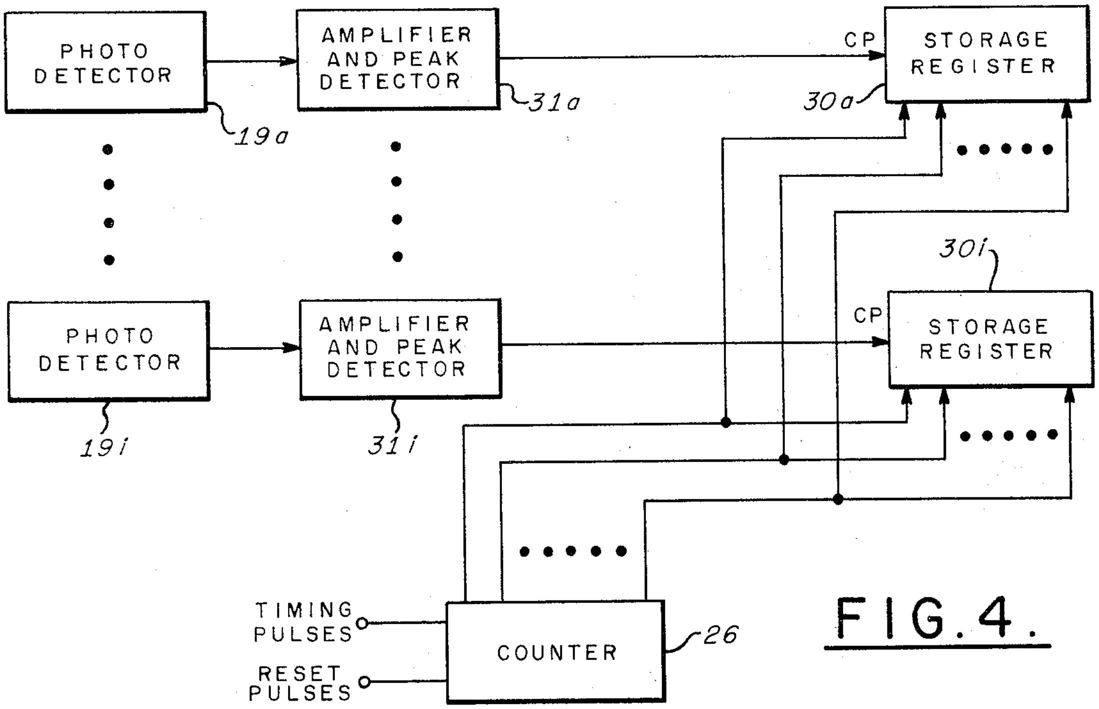
FIG. 4 is a block diagram of digital data processing equipment which may be used in conjunction with the optical inspection devices of FIGS. 1–3 for encoding the sampled fingerprint data.

The encoding of the sample data will now be described with reference to FIG. 4 in conjunction with FIG. 1. Consider specifically sample area 21*a*. As previously explained, for the illustrated vertical orientation of the grating lines detector 19*a* receives minimum light. However, at the instant the grating rotates through the vertical orientation, detector 29 receives light from lamp 27 transmitted through slit 25 adjacent the periphery of the grating and in turn provides an electrical pulse at its output which is coupled to the reset terminal of counter 26 to restore the count therein to zero. As the grating continues to rotate, light is transmitted from lamp 24 through the transparent segments 28 at the periphery of the grating to generate a sequence of electrical pulses at the output of detector 23 which is coupled to the input terminal of counter 26. The counter thus obtains a count which is representative of the angular orientation of the grating irrespective of the constancy of the grating rotational rate. The respective stages of the counter are coupled in parallel to a plurality of storage registers 30*a* to 30*i*. When the grating has rotated 45° from the vertical so the grating lines are horizontal, the light intensity at photodetector 19*a* reaches a maximum at which time peak detector 31*a* coupled to the photodetector 19*a* senses the peak value of the detector output and provides a signal to the clock pulse (CP) input of storage register 30*a* causing the instantaneous counter reading to be coupled to the register for storage therein. The mode of operation is the same for all the other storage registers. As a result, in one-half revolution of the grating a plurality of discrete binary coded signals are produced each corresponding to an individual sample area, the totality of encoded signals in registers 30*a* to 30*i* corresponding to the totality of sample areas and being uniquely representative of a particular fingerprint.

The stored encoded signals may be used subsequently in accordance with conventional digital autocorrelation techniques well known to those skilled in the art for the purpose of comparison with encoded signals generated in response to a fingerprint presented for identification. The degree of dissimilarity tolerable between the stored and generated signals representative of the fingerprint to be identified may be adjusted depending on the requirements of a particular application in accordance with the number of fingerprints involved and the amount of subsequent visual comparison considered acceptable. In any case, it will be appreciated that it is inconsequential whether the orientation of the ridge lines of a single fingerprint happen to be identical or nearly identical in two or more sample areas. Under these circumstances, the encoded signals corresponding to the similar ridge line orientations will likewise be similar, but nevertheless still required to correlate with like signals of the same sample areas for the purpose of effecting identification.

The foregoing description has been made with reference to use of the maximum signal level of the photodetectors. It should be understood that the minimum signal level may be employed for the same purpose and, in fact, may be preferable for one reason or another. For instance, use of the maximum signal level was based on the assumption that the diffracted light would spread an amount equal to the width of only one transparent or opaque line at the location of the grating. Such operation can be readily achieved in the case of light of a single wavelength (single color) in accordance with the mathematical relation $S=f\lambda/d$, where $S$ is the distance through which the diffracted light is spread across the grating, $f$ is the focal length of the lens (17 in FIG. 1) producing the superposed grating image, $d$ is the distance between the ridges of the fingerprint and $\lambda$ is the wavelength of the incoherent light. As an illustrative example, if the light wavelength is 0.6 microns, the distance between the ridge lines is $d$=0.05 cm and $f$=40 cm, the spreading at the location of the grating due to diffraction by the fingerprint will be $S=40\times0.6\times10^{-4}/0.05=0.05$ centimeters, for which the grating spacing would be 0.1 centimeter corresponding to a periodicity of 10 lines per centimeter. To achieve such operation with a white light or multicolor source, it would be necessary to insert a filter in the path of the incoherent beam adjacent the light source or at some other appropriate and convenient location. Multicolor or white light may be used, however, if desired; but in such case, it will be appreciated that the diffracted light will not necessarily be confined to the region of the transparent grating lines. As a consequence, the condition of maximim light intensity at the respective photodetectors will not be sharply defined, but instead will be considerably broadened thereby impairing the encoding accuracy of the system. This difficulty can be avoided by using null detectors in place of the peak detectors of FIG. 4 to determine the condition of minimum light intensity at the photodetectors and thereby signify the instants at which the counter is to be read out to the respective storage registers. Such operation is possible with a multicolor light source since under a condition where the ridge lines are perpendicular to the grating lines the diffracted spectral components of the light will simply be spread along the direction of the grating lines so as to be blocked from the detectors. This happens because of the focusing action of lens 17.

The off-axis devices of FIGS. 2 and 3 will now be described. Both of these devices may be combined with the digital processing equipment of FIG. 4 to operate in the same manner as previously explained with reference to FIG. 1 for initially encoding known fingerprints and thereafter identifying unknown fingerprints. In other words, the off-axis devices function exactly the same as the previously described on-axis system in the sense of providing an unmagnified grating image superposed with the grating such that in the absence of an input fingerprint minimum light intensity reaches the detector array while in the presence of a fingerprint light of cyclically varying intensity is diffracted to the detectors in accordance with the relative spatial orientation of the grating lines and ridge lines of the individual sample areas. The principal point of distinction between the on-axis and off-axis devices resides in the fact that in the latter the superposed grating image is erect or non-inverted as compared to the inverted image produced in the on-axis system. Because of this difference, precision grating rulings of constant spacing are not required in the off-axis system as will become apparent from a reading of the subsequent paragraphs, nor is precise alignment of the grating rotational axis required relative to either the grating lines or the optical axis of the system. In addition, the grating drive mechanism is simplified by virtue of the direct axial drive.

Figure 2:
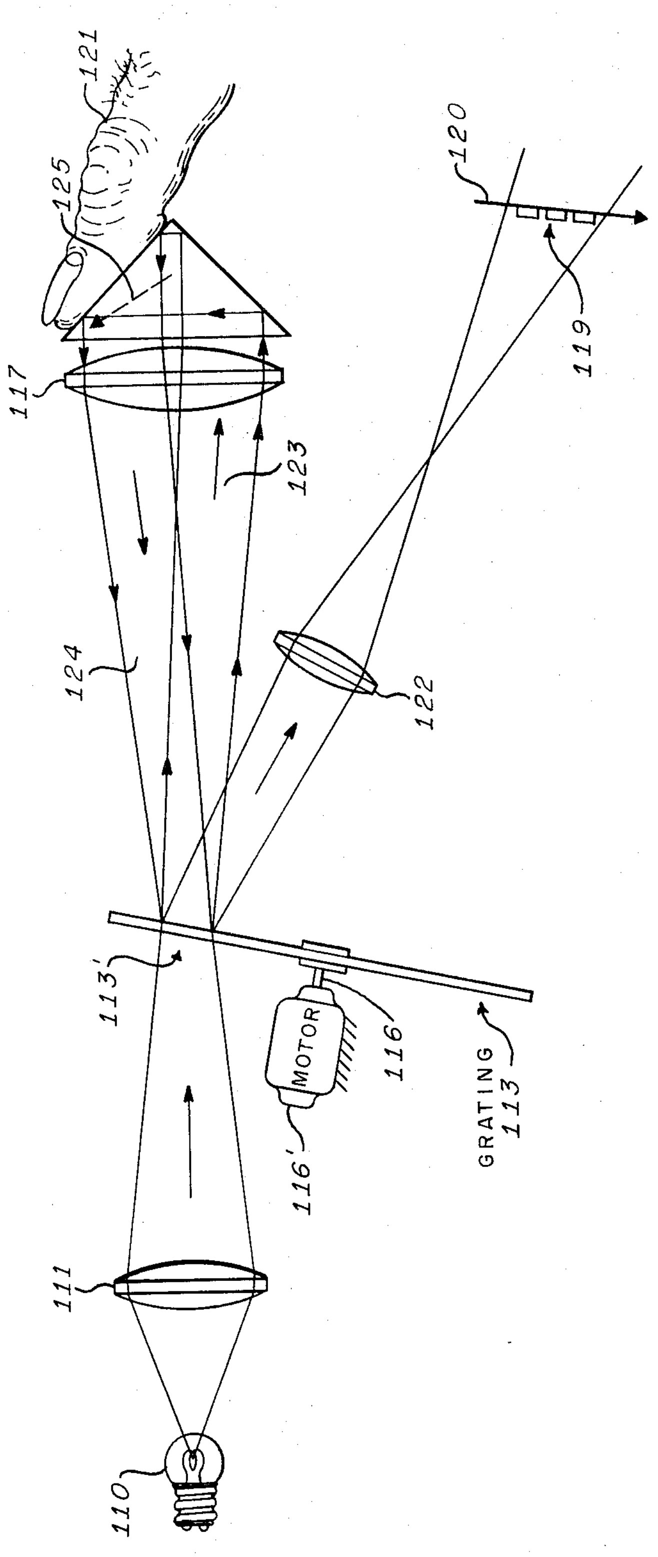
FIGS. 2 and 3 are simplified schematic diagrams of respective off-axis systems embodying the principles of the present invention.

Referring now specifically to FIG. 2, light emitted from incoherent light source 110 is collected by lens 111 and converged onto region 113′ of metallized grating 113 which has alternate parallel light transmissive and reflective lines (as shown in FIG. 1) and is rotatable about its center axis 116 by motor 116′. The light propagated through the transmissive grating lines forms a beam 123 directed through the lower half of lens 117 onto retroreflecting prism 118 from which the incident beam reflects as beam 124 directed through the upper half of lens 117 onto the portion of the grating originally irradiated by the light from lens 111. Lens 117 is spaced from the grating by a distance equal to the focal length of the lens. Consequently, an image of the grating is produced superposed on the grating essentially in the same manner as explained with reference to the apparatus of FIG. 1 except that in this case the image is erect so that the illuminated and dark image lines coincide with the transmissive and reflective grating lines, respectively. Thus, in the basence of a fingerprint placed in contact with the retroreflecting prism, the light of the superposed image simply propagates back through the grating toward the light source leaving essentially no light available to be collected by imaging lens 122 for transmission to photodetector array 119 positioned in a plane designated by line 120.

In the presence of a finger 121 placed on the top surface of the retroreflecting prism, light is diffracted by the ridge lines of the finger similar to the diffraction produced by a transparency, as is well known to those skilled in the art, whereupon the diffracted part of the light in beam 124 impinges on the reflective lines of the grating to be reflected, by virtue of the canted orientation of the grating relative to the light beam, through imaging lens 122 to the photodetector array. The disposition of the detectors for sampling discrete areas of the fingerprint is the same as explained with reference to the previously described on-axis system. Dashed line 125 depicts the apparent optical position of the finger taking into account the refractive index properties of the prism. As indicated, the apparent position is sloped relative to the actual finger orientation and therefore the plane of the detector array is similarly sloped in order for the fingerprint image to be in focus at the detector array. It will be appreciated that this system may also be used for identification of recorded fingerprint data by placing the recording on the prism in place of a finger. Alternatively, the transparency recording may be positioned proximate the prism surface adjacent lens 117. In any case, the operation of the system with regard to the effect of grating rotation is the same as explained for the on-axis system. Likewise, the method of generating the counter-pulses and encoding the sampled fingerprint data may be performed in the same manner as explained for the on-axis system.

Figure 3:
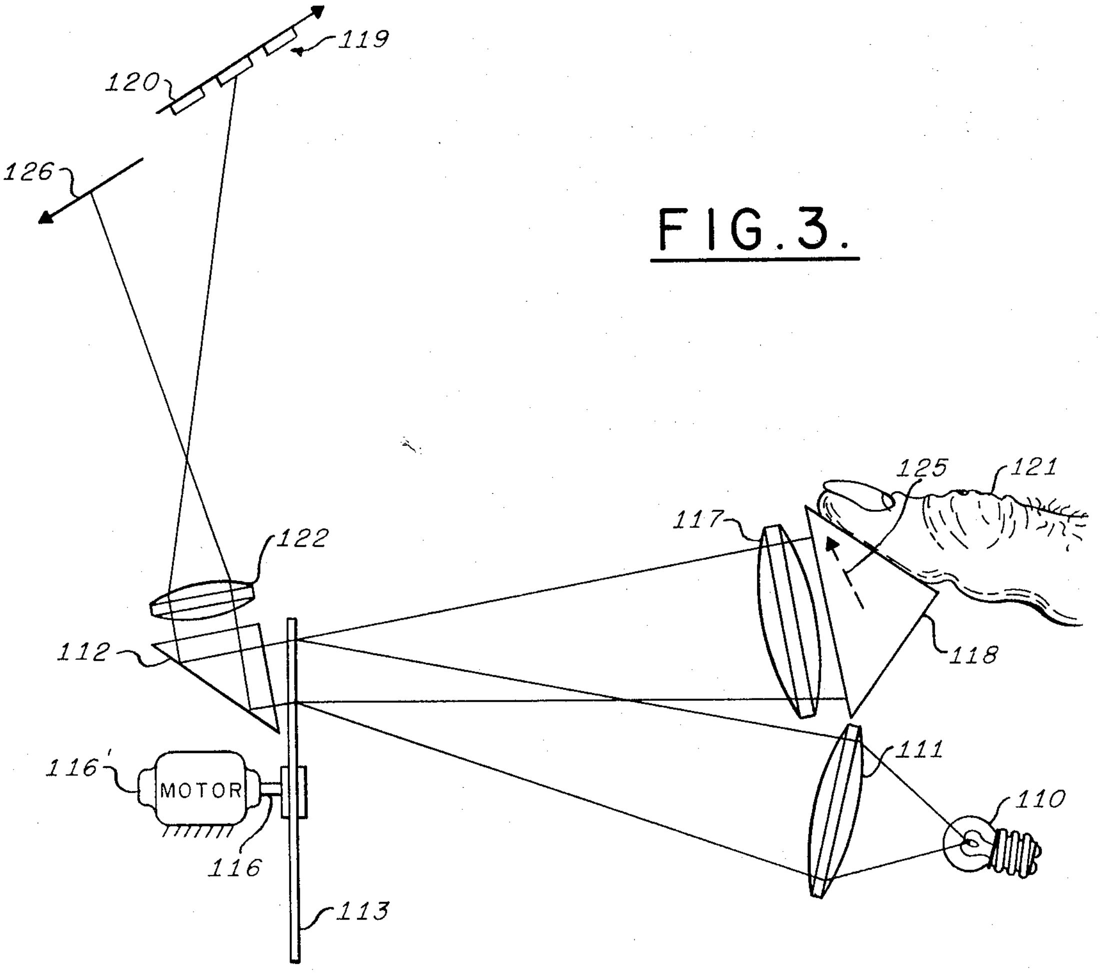

The apparatus of FIG. 3 is generally the same as that of FIG. 2 and accordingly like components are identified by the same numeral designation. Again, lens 117 is spaced from the grating by a distance equal to the focal length of the lens. In the apparatus of FIG. 3 though, the incoherent light of the source 110 is directed to the retroreflecting prism 118 by means of reflection from the grating rather than by transmission therethrough as in the apparatus of FIG. 2. The illuminated lines of the superposed grating image therefore impinge on the reflective grating lines so that in the absence of a finger on the prism light is blocked by the grating from reaching the detector array 119 located in a plane designated by the line 120. In the presence of a finger, on the other hand, diffracted light is propagated through the transmissive lines of the grating to reflect from prism 112 through imaging lens 122 onto the detector array. In this system it will be noted that the beam reflected from the grating toward lens 117 fills substantially the full aperture of the lens and prism. As a result, the lower half of the beam after entering the prism through the surface adjacent lens 117 impinges first on the bottom surface of the prism and then strikes the finger to be reflected back toward the grating, whereas the upper half of the beam impinges first on the fingerprint and then strikes the lower surface of the prism for reflection back to the grating. This action causes two spatially separated images of the fingerprint to be produced, one at the location of the detector array and the other at a plane designated by line 126. The alternate image may be used, for instance, for visual observation of the fingerprint. In view of the fact that the image at the detector array is produced by light which is reflected from the finger directly back to the grating, it is further removed from the imaging lens 122 than the image at plane 126 which is produced by light that impinges on the lower surface of the prism, after having reflected from the finger, before propagating back toward the grating. In other words, the finger is closer to imaging lens 122 in the case of the image formed at detector array 119 than it is for the image produced at plane 126. In addition, it will be noted that the respective images are inverted relative to one another as indicated by the arrows at planes 120 and 126. It will also be apparent that the system of FIG. 2 may be constructed so as to provide the double image achieved with the system of FIG. 3 and, conversely, the apparatus of FIG. 3 may be modified to provide a single image as in the apparatus of FIG. 2. Further, it will be appreciated by those skilled in the art that light reflection caused by air-to-glass interfaces can be reduced and the contrast of the filtered image increased by applying antireflection coatings to one or both sides of the metalized rulings shown in FIGS. 2 and 3.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. Pattern inspection apparatus comprising a rotatable grating having alternate light transmissive and reflective lines, means including a light source for directing a light beam onto the grating, means disposed in the path of light propagated from a part of said grating irradiated by the light beam of the light source for directing light received from the grating back onto the grating to produce in superposed relation with said grating part an equivalent size image thereof wherein the image light impinges on alternate lines of the grating, said grating image producing means including means for supporting an input pattern to be inspected in the light received from the grating, said input pattern being characterized by light transmissive or reflective lines of random orientation over the area of the pattern having the effect when present at said supporting means of diffracting light which is spatially separated from the grating image light at the location of the grating, means for rotating the grating to move the grating lines illuminated by the grating image in a common plane transversely of the light beam directed thereon from the light source whereby the superposed grating image light continuously impinges on alternate lines of the grating, means disposed to receive, under the condition of an input pattern present at said supporting means, light diffracted by the pattern and filtered by the grating to the exclusion of substantially all of the grating image light for producing an image of the pattern, a detector array disposed for receiving the light of the pattern image, said detector array including a plurality of detectors each arranged to receive light forming an image of a discrete sample area of the input pattern, the image light of each said descrete sample area being diffracted in a prescribed direction in accordance with the line orientation in the respective sample areas whereby the diffracted light reaching each detector passes through an extremum value during each half revolution of the grating, and means for determining the angular orientation of the grating relative to a reference orientation at the instant of an extremum value of the light intensity at the respective light detectors.

2. The apparatus of claim 1 wherein the angle determining means includes means for generating a signal representative of each angle, and further comprising means for storing the respective angle representative signals.

3. The apparatus of claim 1 wherein the grating lines are of substantially uniform width, and the grating rotational axis passes through the boundary of adjoining grating lines and is coincident with the axis of the light beam directed onto the grating from the source.

4. The apparatus of claim 1 wherein the rotational axis of the grating is skewed relative to the axis of the light beam directed thereon from the light source which is positioned on one side of the grating, and the detector array and the grating image producing means are disposed in angularly spaced relation to the light source on the side of the grating opposite from the light source, said grating image producing means being so constructed and arranged relative to the grating that the light beam from the light source incident on the grating is transmitted through the transmissive grating lines to impinge on said grating image producing means and be directed therefrom to propagate back onto the transmissive grating lines whereby in the absence of an input pattern substantially none of the light directed back to the grating reaches the detector array whereas in the presence of an input pattern at said supporting means some of the light impinging on said grating image producing means is diffracted by the input pattern so as to propagate onto the reflective grating lines to be reflected therefrom to the detector array.

5. The apparatus of claim 4 wherein the grating image producing means includes a lens and retroreflective prism, the lens being positioned intermediate the prism and grating at a distance from the grating equal to the focal length of the lens, and the prism being oriented so that light enters the prism from the lens and leaves the prism to return to the lens through a first surface adjacent the lens, a second surface of the prism constituting the supporting means for supporting the input pattern to be inspected.

6. The apparatus of claim 5 wherein the size of the first surface of the prism relative to the light impinging thereon is such that a first part of the impinging light passes through the first prism surface to strike the second surface, which is adapted for supporting the input pattern, and be deflected therefrom to a third surface of the prism from which the light is reflected back through the first surface and adjacent lens to the grating while a second part of the impinging light passes through the first prism surface to strike the third surface and be deflected therefrom to the second surface from which the light is reflected back through the first surface and adjacent lens to the grating, the prism being oriented relative to the lens so that the pathlength of the first part of the beam from the pattern supporting surface to the lens is different than the pathlength of the second part of the beam from the pattern supporting surface to the lens thereby providing two spatially separated images of an input pattern present at the second prism surface, one of said pattern images being formed at the detector array and the other image being formed at a location apart from the detector array.

7. The apparatus of claim 1 wherein the rotational axis of the grating is skewed relative to the axis of the light beam directed thereon from the light source, the detector array is positioned on one side of the grating, and the light source and the grating image porducing means are disposed in spaced relation on the side of the grating opposite from the detector array, said grating image producing means being so constructed and arranged relative to the grating that the light beam from the light source incident on the grating is reflected from the reflective grating lines to impinge on said grating image producing means and be directed therefrom to propagate back onto the reflective grating lines whereby in the absence of an input pattern substantially none of the light directed back to the grating reaches the detector array whereas in the presence of an input pattern at said supporting means some of the light impinging on said grating image producing means is diffracted by the input pattern to propagate through the transmissive grating lines to the detector array.

8. The apparatus of claim 7 wherein the grating image producing means includes a lens and retroreflective prism, the lens being positioned intermediate the prism and grating at a distance from the grating equal to the focal length of the lens, and the prism being oriented so that light enters the prism from the lens and leaves the prism to return to the lens through a first surface adjacent the lens, a second surface of the prism constituting the supporting means for supporting the input pattern to be inspected.

9. The apparatus of claim 8 wherein the size of the first surface of the prism relative to the light impinging thereon is such that a first part of the impinging light passes through the first prism surface to strike the second surface, which is adapted for supporting the input pattern, and be deflected therefrom to a third surface of the prism from which the light is reflected back through the first surface and adjacent lens to the grating while a second part of the impinging light passes through the first prism surface to strike the third surface and be deflected therefrom to the second surface from which the light is reflected back through the first surface and adjacent lens to the grating, the prism being oriented relative to the lens so that the pathlength of the first part of the beam from the pattern supporting surface to the lens is different than the pathlength of the second part of the beam from the pattern supporting surface to the lens thereby providing two spatially separated images of an input pattern present at the second prism surface, one of said pattern images being formed at the detector array and the other image being formed at a location apart from the detector array.

10. The apparatus of claim 4 wherein the grating image producing means includes a light reflective member and a lens positioned intermediate the grating and light reflective member at a distance from the grating equal to the focal length of the lens and further including means for supporting a transparency of the input pattern intermediate the lens and reflective member adjacent the latter.

11. The apparatus of claim 7 wherein the grating image producing means includes a light reflective member and a lens positioned intermediate the grating and light reflective member at a distance from the grating equal to the focal length of the lens and further including means for supporting a transparency of the input pattern intermediate the lens and reflective member adjacent the latter.

* * * * *